March 16, 1948. W. S. McLEISH Re. 22,988
ANCHOR
Original Filed May 6, 1942
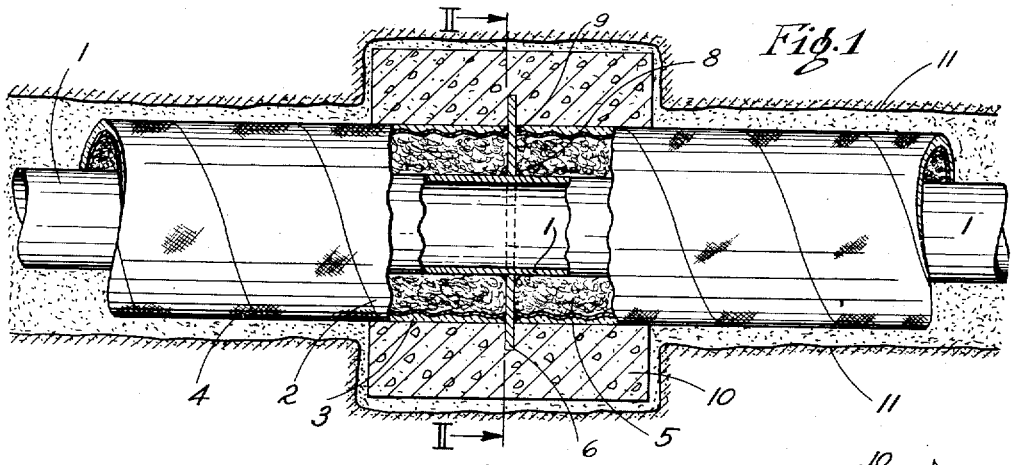
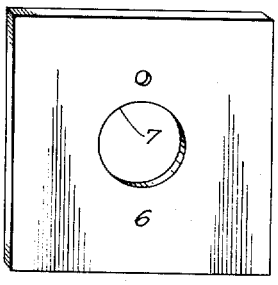
Fig. 3
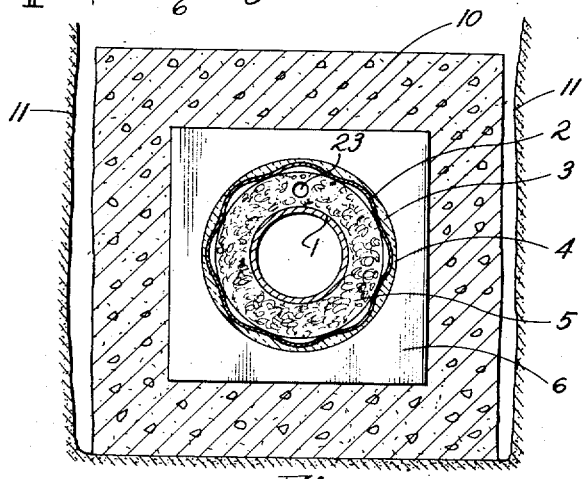
Fig. 2
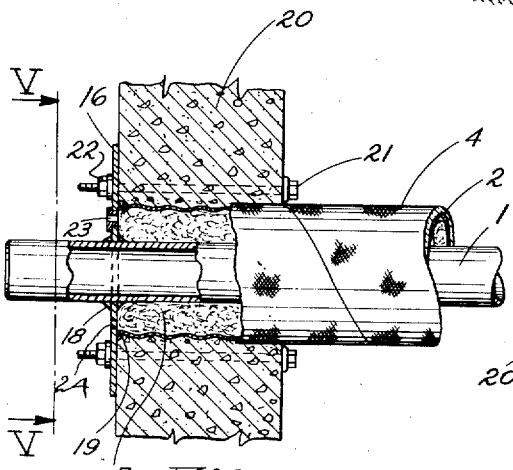
Fig. 4
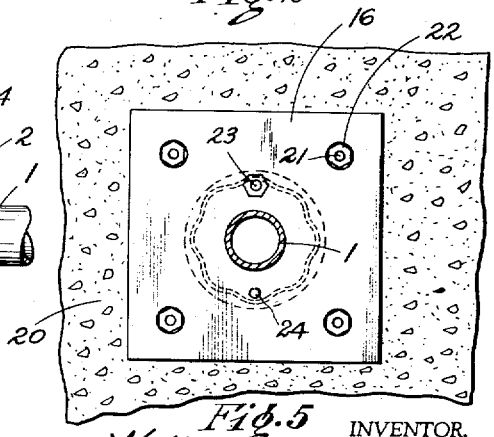
Fig. 5
INVENTOR.
William S. McLeish
BY
Howgood and Van Horn
ATTORNEYS Reissued Mar. 16, 1948

Re. 22,988

UNITED STATES PATENT OFFICE 22,988

ANCHOR

William S. McLeish, Barberton, Ohio, assignor to The Ric-wiL Company, Cleveland, Ohio, a corporation of Ohio Original No. 2,360,067, dated October 10, 1944, Serial No. 441,991, May 6, 1942. Application for reissue January 19, 1948, Serial No. 2,984

6 Claims. (Cl. 138—48)

The invention relates to means for holding conduits and the like in place. It is particularly applicable to conduits which are installed underground.

An object of the invention is to provide an improved means of holding a conduit by securely anchoring one portion thereof.

Another object is to provide an improved means of holding a conduit which will be simple in construction and installation.

Another object is to provide an improved means of holding a conduit which will require very little material.

Another object is to provide an improved means of holding a conduit which will be applicable to fluids and which are provided with an outer casing.

Another object is to provide an improved means of holding a conduit which may be easily applied to a conduit section during its fabrication.

Other objects will hereinafter appear.

The invention will be better understood from the description of several practical embodiments thereof illustrated in the acompanying drawing, in which:

Figure 1 is a fragmentary plan view, parts being broken away and some shown in section, of an intermediate portion of a heat insulated conduit installed in a trench in the ground;

Figure 2 is a cross sectional view taken on the line II—II of Figure 1;

Figure 3 is a perspective view of the anchor plate of the first two figures;

Figure 4 is a fragmentary longitudinal sectional view of a building wall, showing the heat insulated conduit pasing therethrough; and Figure 5 is a transverse view taken on the line V—V of Figure 4.

The conduit illustrated is in general of the type shown in the pending application of Christian Gottwald and William S. McLeish, Serial No. 295,390, filed September 18, 1939, now Patent No. 2,330,966, issued October 5, 1943, and which is now known as the "unit type" of construction, this being used principally for steam lines, and the like, where one or more pipes are used to conduct fluids under temperatures differing from the normal atmospheric or ground temperatures, and therefore are insulated by insulating material contained within a casing or housing, the units consisting of the inner fluid conduit, a layer of insulating material, and the casing, and being prefabricated so that they only need to be joined together at the site of installation.

Of course, such conduits, being subjected to variations in temperature, are also subject to contractions and expansions for which compensation must be provided, and in order that such contractions and expansions shall be properly distributed between the various expansion joints, bends, and the like, it is necessary firmly to locate or anchor certain parts of the conduits intermediate those points at which it is desired the expansion be manifested.

In Figures 1 and 2, a conduit is shown consisting of an inner fluid conducting tube 1 surrounded by a casing 2 which consists of a helically corrugated metallic shell, coated, if desired, with a layer of asphalt 3 and felt or paper 4, as indicated, the space between the casing and shell being filled with heat insulating material 5.

At a point where it is desired to anchor the conduit, is shown a rectangular metal plate 6, which has a central hole 7 permitting it to be slid over the fluid conducting tube 1 during the assembly of the parts, and after being positioned as shown, this plate is permanently fixed to the tube as by welding 8.

The ends of the metallic casing are brought into contact with this plate and also secured to the same by welding 9, so that a tight, rigid structure is provided. Preferably, the casing is welded throughout its periphery to provide an absolute seal against the entrance of moisture at the juncture of casing and anchor plate.

It will be noted, particularly from Figure 2, that the area of the plate is substantially greater than the cross sectional area of the casing, and that, although the plate does not extend far beyond the periphery of the casing intermediate its corners, these projecting corners supply a large exposed area, probably as great as the cross sectional area of the part of the plate within the casing.

When the pipe is installed, a block of concrete 10 or similar material is cast about the casing, completely embedding the plate, and preferably extending somewhat beyond the normal walls 11 of the trench in which the conduit is being placed, so that the block is retained not only by its own weight and inertia, but by bearing at its edges upon the undisturbed earth at the sides of the trench.

As shown in Figures 4 and 5, the conduit is seen penetrating through a building wall 20, at the inner surface of which the outer casing terminates.

At this point, a plate 16 similar to that previously described and having a perforation fitting over the fluid conducting pipe is placed, the plate being welded both to the pipe (at 18) and to the casing (at 19), and being provided with a series of apertures through which extend bolts 21 provided with nuts 22 by which the plate is tightly clamped or held against the surface of the wall 20. In this position, the wall itself takes the place of the concrete block above described, and firmly locates the conduit.

It will be noted that the plates above described furnish large flat bearing surfaces, firmly supported by a concrete or similar masonry material against displacement axially of the pipe, and that the conduit is thus very firmly held, while relatively small unit pressures are imposed upon the plate. Also that the plates are effectively sealed both about the pipes and at the casing, preventing any leakage of moisture into the casing.

It has been found desirable in many instances to provide a vent or aperture 23 through the plates for the escape of steam or the like, should a leak in the pipe develop, or should moisture be contained within the assembly and caused to vaporize on the application of heat thereto.

It has also been found desirable in some installations to provide a similar opening at the bottom of the space defined by the casing 2, such as is shown at 24 in Figures 4 and 5, to act as a drain.

While I have described the illustrated embodiment of my invention in some particularity, obviously many others will readily occur to those skilled in this art, and I do not, therefore, limit myself to the precise details shown and described, but claim as my invention all embodiments, variations, and modifications thereof coming within the scope of the appended claims.

I claim:

1. An underground conduit securing means comprising a perforated plate through the perforation of which a pipe extends, the plate being permanently and unitarily fixed to the exterior of the pipe, a casing consisting of two parts surrounding the pipe, and abutting opposite sides of the plate, sealing means connecting the parts of the casing to the sides of the plate, the plate extending substantially beyond the periphery of the casing to transmit pressure to the ground.

2. Conduit securing means for use with a conduit consisting of a fluid conducting pipe and an outer two-part casing, said securing means comprising a plate having an aperture through which the pipe extends, the plate extending substantially beyond the ends of the casing parts, the pipe being welded to the plate, and the ends of both casing parts being welded to the sides of the plate sealing the entire peripheries of both casing parts to the plate, and a masonry block embedding the casing and the projecting portion of the plate and buried in the ground.

3. Conduit securing means for use with a conduit consisting of a metallic fluid conducting pipe and an outer two-part corrugated sheet metal casing, said securing means comprising a plate having an aperture through which the pipe extends, the plate extending substantially beyond the ends of the casing parts, the pipe being welded to the plate, and the ends of both casing parts being welded to the sides of the plate sealing the entire peripheries of both casing parts to the plate, and a masonry block embedding the casing and the projecting portion of the plate and buried in the ground, the plate having a vent opening therethrough and positioned between the pipe and casing.

4. An underground conduit securing means for a conduit which consists of a pipe and a casing surrounding the same and spaced therefrom, which comprises a perforated plate, the perforation of the plate fitting the exterior of the pipe, means permanently and unitarily fixing the plate to the exterior of the pipe throughout their entire contact, the casing abutting a side of the plate, and securing means sealing said abutting end of the casing to the plate, the plate extending substantially beyond the periphery of the casing and providing a substantial area transmitting pressure to the ground, anchoring means engaging a substantial area of said plate and fixed thereto and permanently positioned in the ground.

5. An underground conduit securing means for a conduit which consists of a pipe and casing surrounding the same and spaced therefrom, which comprises a perforated plate, the perforation of which closely fits the periphery of the pipe, securing means securing the pipe and plate, the end of the casing abutting a side of the plate, and means securing said end of the casing to the plate, the plate extending substantially beyond the casing, a block embedding the end of the casing and abutting a side of the plate, and securing means holding the plate against said block.

6. An underground conduit securing means for a conduit which consists of a pipe and a casing having peripheral projections and depressions surrounding the same and spaced therefrom, which comprises a perforated plate, the perforation of which closely fits the periphery of the pipe, securing means securing the pipe and plate, the end of the casing abutting a side of the plate, and means securing said end of the casing to the plate, the plate extending substantially beyond the casing, a block embedding the end of the casing and entering the depressions between the projections thereof so as to key the block to the casing and abutting a side of the plate, and securing means holding the plate against said block.

WILLIAM S. McLEISH.